United States Patent
Stolzenwald et al.

[15] 3,677,625
[45] July 18, 1972

[54] MOTION PICTURE CAMERA WITH DISSOLVING SHUTTER AND VARIABLE-FOCUS LENS

[72] Inventors: Ralf J. Stolzenwald, Stuttgart; Peter Korner, Reichenbach, both of Germany

[73] Assignee: Robert Bosch Photokino GmbH, Stuttgart, Unterturkheim, Germany

[22] Filed: July 23, 1971

[21] Appl. No.: 165,651

[30] Foreign Application Priority Data

June 31, 1970 Germany......................P 20 38 089.6

[52] U.S. Cl..............................................................352/91
[51] Int. Cl. ........................................................G03b 21/36
[58] Field of Search............................................352/91, 139

[56] References Cited

UNITED STATES PATENTS 3,549,249  12/1970  Katsuyama .............................352/91
3,545,852  12/1970  Winkler et al. ..........................352/91

*Primary Examiner*—Samuel S. Matthews
*Assistant Examiner*—Russell E. Adams, Jr.
*Attorney*—Michael S. Striker

[57] ABSTRACT

A motion picture camera with a variable-focus lens and a fading mechanism having a dissolving shutter is provided with two electric motors one of which drives the pull-down for film transport (70) and the other of which can selectively adjust the variable-focus lens or the shutter (16). The other motor (16) is normally connected with the variable-focus lens but can be disconnected from the variable-focus lens and connected with the dissolving shutter during the making of exposures with fade-out or fade-in effect. The other motor (16) is reversible and the one motor (70) is also of the reversible type if the camera is designed to effect the rearward transport of those film frames which were exposed with fade-out effect in order to expose such film frames with fade-in effect.

20 Claims, 3 Drawing Figures

Patented July 18, 1972
3,677,625
2 Sheets-Sheet 1
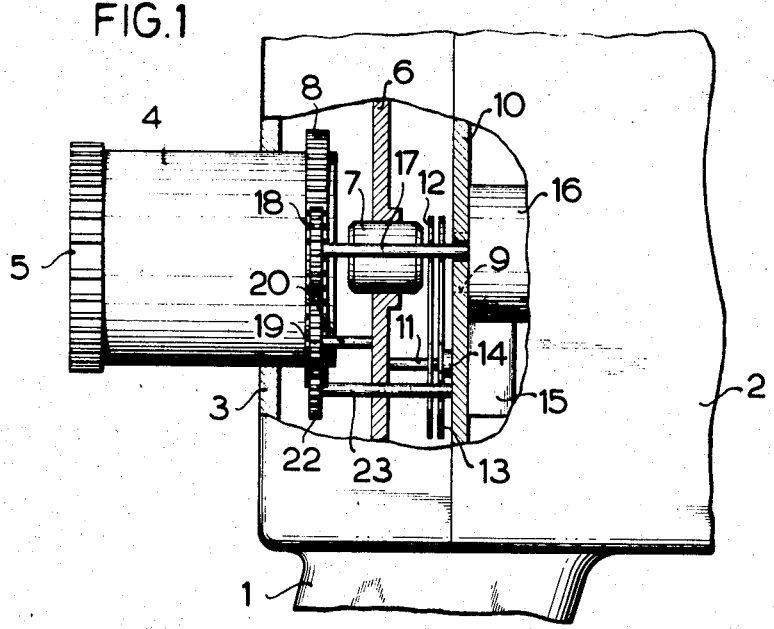
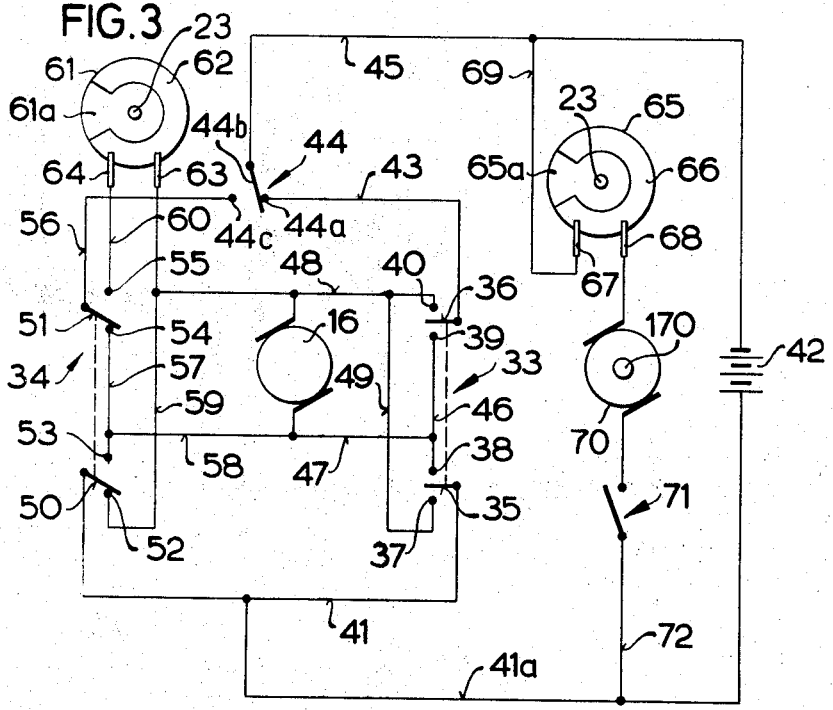
INVENTORS
Peter KÖRNER
Ralf J. STOLZENWALD
By Michael S. Striker
their ATTORNEY Patented July 18, 1972

INVENTORS
Peter KÖRNER
Ralf J. STOLZENWALD

By Michael S. Struker their ATTORNEY

MOTION PICTURE CAMERA WITH DISSOLVING SHUTTER AND VARIABLE-FOCUS LENS

BACKGROUND OF THE INVENTION

The present invention relates to motion picture cameras in general, and more particularly to improvements in motion picture cameras with variable-focus lenses or zoom lenses which are adjustable over a desired range of focal lengths. Still more particularly, the invention relates to improvements in motion picture camera which, in addition to a variable-focus lens, are further provided with a fading mechanism enabling the user to make exposures with fade-in and/or fade-out effect.

Motion picture cameras with variable-focus lenses are provided with manually operated or power-operated means for adjusting the variable-focus lens over a desired range of focal lengths. As a rule, the motor which is employed in power-operated adjusting means for the variable-focus lens is a reversible electric motor which can be started in either direction in order to either increase or reduce the focal length of the variable-focus lens. It is also known to provide such motion picture cameras with a fading mechanism which enables the user to make exposure with fade-out or fade-in effect or with the so-called lap dissolve or mix in which one scene merges almost imperceptibly into the next. The means for adjusting the dissolving shutter in such cameras is manipulated by hand or includes a second motor which is not capable of adjusting the variable-focus lens.

BACKGROUND OF THE INVENTION

The present invention relates to motion picture cameras in general, and more particularly to improvements in motion picture cameras with variable-focus lenses or zoom lenses which are adjustable over a desired range of focal lengths. Still more particularly, the invention relates to improvements in motion picture cameras which, in addition to a variable-focus lens, are further provided with a fading mechanism enabling the user to make exposures with fade-in and/or fade-out effect.

Motion picture cameras with variable-focus lenses are provided with manually operated or power-operated means for adjusting the variable-focus lens over a desired range of focal lengths. As a rule, the motor which is employed in power-operated adjusting means for the variable-focus lens is a reversible electric motor which can be started in either direction in order to either increase or reduce the focal length of the variable-focus lens. It is also known to provide such motion picture cameras with a fading mechanism which enables the user to make exposures with fade-out or fade-in effect or with the so-called lap dissolve or mix in which one scene merges almost imperceptibly into the next. The means for adjusting the dissolving shutter in such cameras is manipulated by hand or includes a second motor which is not capable of adjusting the variable-focus lens.

SUMMARY OF THE INVENTION

An object of the invention is to provide a novel and improved motion picture camera with a variable-focus lens and with a fading mechanism for the making of effect shots known as fade-in and fade-out, and to provide such camera with novel and improved means for adjusting the variable-focus lens and he dissolving shutter of the fading mechanism.

Another object of the invention is to provide a motion picture camera wherein the prime mover which can be employed to adjust the variable-focus lens can also serve as a means for effecting adjustments of the dissolving shutter.

A further object of the invention is to provide a motion picture camera with a variable-focus lens and with a fading mechanism which is simpler, more compact, less expensive and less prone to malfunction than presently known motion picture cameras which embody a fading mechanism and a variable-focus lens.

An additional object of the invention is to provide novel and improved connections between a prime mover and the variable-focus lens as well as between a prime mover and the dissolving shutter of the fading mechanism in a motion picture camera.

In accordance with a feature of the invention, the motion picture camera comprises variable-focus lens means or zoom lens means which is adjustable over a range of focal lengths, a fading mechanism including adjustable dissolving shutter means for the making of exposures with fade-out and fade-in effect, and an adjusting device for the lens means and shutter means. The adjusting device comprises a single electric motor (preferably a reversible electric motor) and a connecting arrangement for operatively connecting the motor with a selected one of the two means at a time, i.e., with the lens means or with the shutter means.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING:

FIG. 1 is a fragmentary schematic partly elevational and partly vertical sectional view of a motion picture camera which embodies the invention;

FIG. 3 is a diagram of the electric circuit of the motion picture camera.

Figure 2:
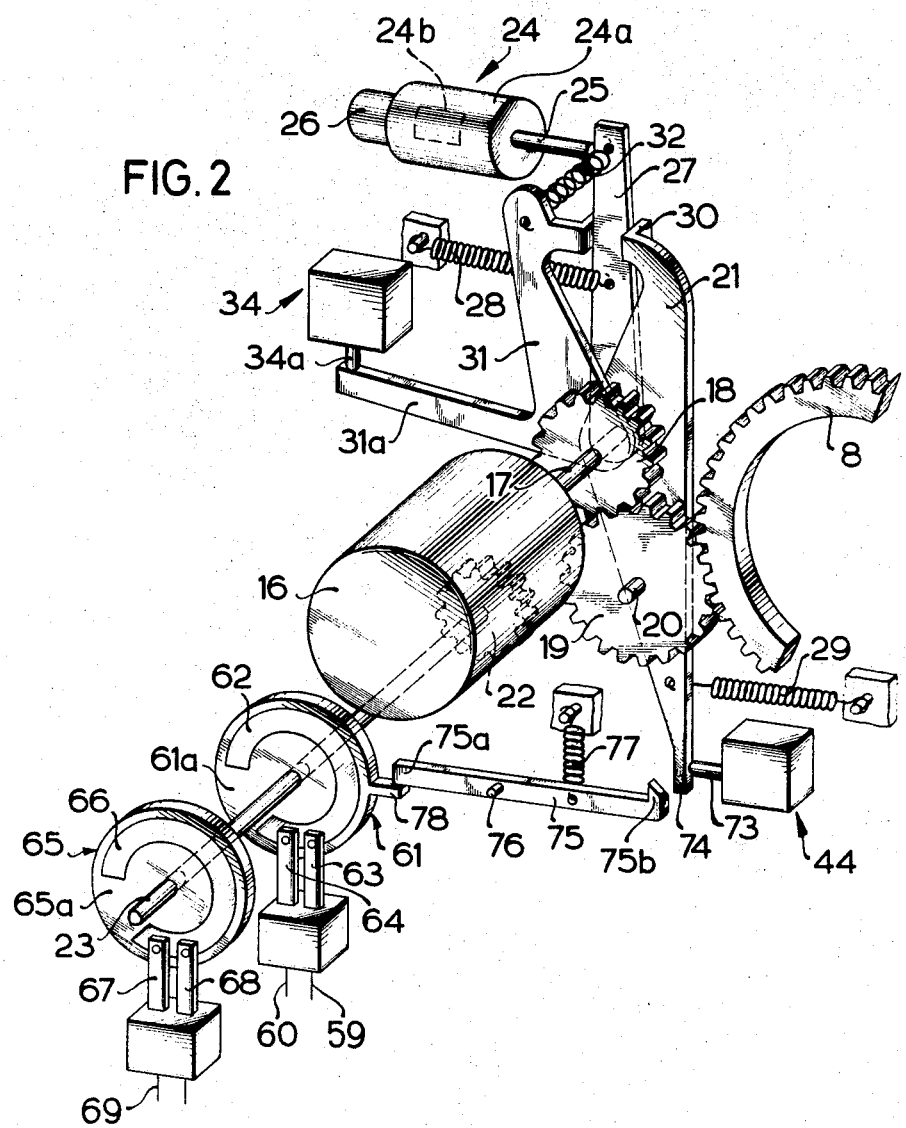
FIG. 2 is a perspective view of the adjusting device for the variable-focus lens and the dissolving shutter.

DESCRIPTION OF THE PREFERRED EMBODIMENTS:

Referring first to FIG. 1, the motion picture camera comprises a housing or body 2 having a handle 1 and a front wall 3 which supports a variable focus lens or zoom lens 4. The mount of the zoom lens 4 carries at its front end a focusing ring 5 and the mobile optical elements in the mount of the zoom lens 4 cooperate with a base objective 7 which is mounted in an intermediate wall or partition 6 of the housing 2. The image of the subject or scene is focused into unexposed film frames (not shown) behind the base objective 7.

The rear end portion of the amount for the zoom lens 4 carries a gear 8 which serves as a rotary adjusting member for the focal length. By rotating in opposite directions, the adjusting member or ring 8 causes appropriate changes in the focal length, i.e., the focal length is reduced in response to rotation of the gear 8 in a first direction and is increased in response to rotation of the gear 8 in the opposite direction. The details of the mechanisM which is installed in the mount of the zoom lens 4 and receives motion from the gear 8 form no part of the present invention.

A second intermediate wall or partition 10 of the housing 2 is located behind the wall 6 and is provided with and aperture 9 for the admission of light to unexposed film frames. The pasage of light from the base objective 7 into the aperture 9 is controlled by an adjustable dissolving shutter which forms part of a fading mechanism and has two blades 12, 13 respectively mounted on shafts 11 and 14. The blades 12, 13 have customary openings which register with each other in normal operation of the motion picture camera. During the making of exposures with fade-out effect, the shaft 14 is caused to gradually turn the rear blade 13 with reference to the front blade 12 so that the effective size of the opening in the front blade 12 decreases and is reduced to zero upon exposure of a predetermined number of frames with fade-out effect. The shaft 14 is hollow and surrounds a portion of the shaft 11. These shafts extend into the casing 15 of a transmission which causes the shaft 14 to turn the rear blade 13 with reference to the front blade 12 when the camera makes exposures with fade-out effect and again when the camera makes exposures with fade-in effect. The film may (but need not) be transported rearwardly upon completion of exposures with fade-out effect so that the frames which were exposed with fade-out effect are moved upstream of the aperture 9 (toward the supply reel, not shown) to be exposed again but with fade-in effect when the drive for the film transport again starts to advance the film in a forward direction. The construction of the transmission which is mounted in the casing 15 and serves to rotate the shaft 14 and rear blade 13 with reference to the shaft 11 and front blade 12 during the making of exposures with fade-out and fade-in effect forms no part of the present invention. Such transmission insures that the dissolving shutter remains closed (i.e., that the rear blade 13 overlies the entire opening in the front blade 12) during rearward transport of motion picture film upon completion of exposures with fade-out effect and prior to the making of exposures with fade-in effect.

In accordance with a feature of the invention, the motion picture camera comprises an adjusting device having a single reversible electric motor 16 which can rotate the adjusting member or gear 8 to thereby change the focal length of the zoom lens 4 or which can cause the transmission in the casing 15 to rotate the shaft 14 and rear blade 13 with reference to the shaft 11 and front blade 12 during the making of exposures with fade-out and fade-in effect. The motor 16 is mounted at the rear (right-hand) side of the partition 10 and has an output shaft 17 provided with a gear 18 which meshes with a gear-shaped driving member 19. The shaft 20 of the driving member or gear 19 is mounted on a pivotable carrier 21 (see FIG. 2) which can move the gear 19 into mesh with the gear 8 or into mesh with a second adjusting member or gear 22. The carrier 21 is pivotable about the axis of the output shaft 17 so that the gear 19 remains in mesh with the gear 18 in all angular positions of the carrier. The gear 22 is mounted on a shaft 23 which is the input shaft of the transmission in the casing 15.

The carrier 21 is a two-armed lever which can be pivoted by hand against the opposition of a helical spring 29. The selector means 24 for pivoting the lever or carrier 21 against the opposition of the spring 29 so as to move the gear 19 into mesh with the gear 22 comprises a spring-biased plunger or pusher 25 which can be shifted in a direction to the right, as viewed in FIG. 2, in response to depression of a pushbutton or knob 26. The cylindrical sleeve 24a or housing for the pusher 25 is provided with detent means (schematically shown of 24b) which yieldably retains or holds the pusher 25 in the depressed position in response to a first depression of the knob 26. The pusher 25 is disengaged from or freed by the detent means 24b in response to the next-following (second) depression of the knob 26 so that it can return to a retracted position in which the spring 29 is free to maintain the gear 19 on the carrier 21 in mesh with the gear 8. The detent means 24b in the sleeve 24a of the selector means 24 can be constructed in a manner as known from the art of ball point pens or like writing implements wherein a first depression of the knob at the rear end of the housing of the pen causes the ball point to emerge from the front end of the housing and the next-following depression of the knob results in retraction of the ball point.

The output shaft 17 of the motor 16 further mounts a one-armed lever 27 which is biased in a counterclockwise direction (as viewed in FIG. 2) by a helical spring 28 so that it bears against the exposed front end face of the pusher 25. The right-hand edge face of the lever 27 abuts against a bent-over tip 30 on the upper arm of the carrier 21. Thus, the spring 28 biases the lever 27 against the pusher 25 and the spring 29 biases the tip 30 against the lever 27. The left-hand edge face of the lever 27 (i.e., that edge face which engages the pusher 25) is further engaged by one arm of a bell crank lever 31 which is pivotable about the axis of the output shaft 17 and is coupled to the lever 27 by a helical spring 32.

The electric circuit of the motion picture camera, including the motor 16, is shown in FIG. 3. This circuit comprises two independent reversing switches 33 and 34 each of which can be actuated to change the polarity of the motor 16 and to thus change the direction of rotation of the output shaft 17. When not actuated, the switch 33 automatically assumes a neutral position (shown in FIG. 3) in which its movable contacts 35, 36 are spaced from the respective pairs (37, 38 and 39, 40) of fixed contacts. The purpose of the reversing switch 33 is to change the polarity of the motor 16 during adjustment of the focal length of the zoom lens 4. The switch 34 serves to change the polarity of the motor 16 subsequent to making of exposures with fade-in effect and prior to the making of exposures with fade-in effect. The reversing switch 34 can be actuated by the arm 31a of the bell crank lever 31 (see FIG. 2). The switch 34 has a depressible pin 34a which is biased outwardly by a spring (not shown) so that it bear against the arm 31a of the lever 31.

The movable contacts 35, 36 of the reversing switch 33 are mechanically coupled to each other as indicated by a broken line. The movable contact 35 is connected with a first movable contact 50 of the reversing switch 34 by a conductor 41. The conductor 41 is further connected with one pole of an energy source 42 (e.g., one or more batteries) by a conductor 41a. The movable contact 36 of the reversing switch 33 is connected by conductor 43 with he fixed contact 44a of a change over switch 44 which further includes a movable contact 44b and a second fixed contact 44c. A conductor 45 connects the movable contact 44b of the change over switch 44 with the other pole of the energy source 42. The fixed contacts 38, 39 of the reversing switch 33 are connected to each other by a conductor 46; the conductor 46 is further connected with the motor 16 by a conductor 47. A conductor 48 connects the motor 16 with the fixed contact 40 and with the fixed contact 37 (by way of a conductor 49).

The movable contact 50 of the reversing switch 34 is mechanically connected with a second movable contact 51 (the mechanical connection is indicated by a broken line). The movable contacts 50, 51 normally engage fixed contacts 52, 54 and are movable as a unit to respectively engage fixed contacts 53, 55 of the reversing switch 34. As mentioned before, the movable contact 50 is connected with one pole of the energy source 42 by conductors 41 and 41a. The movable contact 51 is connected with the fixed contact 44c of the changeover switch 44 by a conductor 56. The fixed contacts 53, 54 are connected with each other and with the motor 16 by conductors 57, 58. The fixed contacts 52, 55 are respectively connected with elastic terminals 63, 64 by conductors 59 and 60. The terminals 63, 64 are adjacent to a timer disk 61 which determines the length of the interval of operation of the motor 16 during the making of exposures with fade-out effect. The disk 61 comprises an exposed ring-shaped conducting portion 62 which is interrupted by an insulator 61a. Both elastic terminals 63, 64 bear against the conducting portion 62 in the illustrated angular position of the timer disk 61. As shown in FIG. 2, the timer disk 61 is fixedly mounted on the shaft 23 of the transmission in the casing 15 and assumes the angular position shown in FIGS. 2 and 3 when the camera operates normally, i.e., without making exposures with fade-out or fade-in effect (the opening of the rear shutter blade 13 in full registry with the opening of the front shutter blade 12).

The input shaft 23 of the transmission in the casing 15 further carries a second timer disk 65 which is coaxial with the timer disk 61 and also comprises an exposed ring-shaped conducting portion 66 interrupted by an insulator 65a and cooperating with two elastic terminals 67, 68. The terminals 67 is connected with the other pole of the energy source 42 and with the movable contact 44b of the changeover switch 44 by a conductor 69, and the terminal 68 is connected with the main motor 70 of the camera. The motor 70 formS part of the drive for film transport. A conductor 72 which connects the motor 70 with the one pole of the energy source 42 by way of the conductor 41a contains a master switch 71 which constitutes the release element of the camera. The purpose of the timer disk 65 is to automatically arrest the motor 70 with a predetermined delay following the start of exposures with fade-out effect. During the making of exposures with fade-out or fade-in effect, the motor 70 transports the film forwardly by way of the customary intermittent or claw pull-down, not shown.

The changeover switch 44 has a depressible pin 73 (FIG. 2) which is biased outwardly by a spring (not shown) so that it bear against an extension or tip 74 on the lower arm of the carrier 21. The extension 74 can pivot and can be engaged by the pallet 75b of a blocking pawl 75 which is pivotable on a pin 76 and is biased in a counterclockwise direction, as viewed in FIG. 2, by a helical spring 77. The spring 77 normally biases the end portion 75a of the pawl 75 against a projection or lug 78 on the timer disk 61. When the knob 26 is depressed to pivot the carrier 21 in a clockwise direction, as viewed in FIG. 2, through the intermediary of the pusher 25 and lever 27, the extension 74 can be engaged and held by the pallet 75b of the blocking pawl 75. The driving member or gear 19 on the carrier 21 is then disengaged from the adjusting member or gear 8 and meshes with the adjusting member or gear 22 so that the dissolving shutter can be adjusted by the motor 16 while the latter is disconnected from the zoom lens 4. When the making of exposures with fade-in effect is completed, the projection 78 of the timer disk 61 pivots the blocking pawl 75 in a clockwise direction, as view in FIG. 2, to disengage the pallet 75b from the extension 74 so that the carrier 21 is free to pivot in a counterclockwise direction under the action of the spring 29.

The operation:

The master switch 71 is normally open. This switch is closed to connect the motor 70 of the drive for film transport in circuit with the energy source 42. The output shaft 170 of the motor 70 then rotates in a direction to advance the film forwardly. Also, the output shaft 170 of the motor 70 drives the shafts 11 and 14 of the dissolving shutter by way of a power train which is not specifically shown in the drawing. The film is advanced by the customary claw pull-down which derives motion from the output shaft 170 of the motor 70. The opening of the rear shutter blade 13 is in full registry with the opening of the front shutter blade 12 so that the rear blade 13 does not influence the amounts of scene light which reach successive film frames behind the aperture 9.

If the user wishes to change the focal length of the zoom lens 4, the parts of the selector means 24 must assume the positions shown in FIG. 2. Thus, the carrier 21 maintains the gear 19 in mesh with the gear 8, and the arm 31a of the bell crank lever 31 maintains the movable contact 44b of the changeover switch 44 in the position shown in FIG. 3. The movable contact 44b connects the movable contact 36 of the reversing switch 33 with the other pole of the energy source 42. Depending on the desired direction of movement of the zoom lens 4, the user actuates the switch 33 to move the contacts 35, 36 from the illustrated neutral positions into engagement with the fixed contacts 37, 39 or with the fixed contacts 38, 40. This causes the output shaft 17 of the motor 16 to rotate in a first or in a second direction and to rotate the gear 8 in the same direction through the intermediary of the gear 19 on the carrier 21.

When the reversing switch 33 is actuated to move the contacts 35, 36 into engagement with the fixed contacts 37, 39, the circuit of the motor 16 is completed from the other pole of the energy source 42, through the conductor 45, contacts 44b, 44a of the changeover switch 44, conductor 43, contacts 36, 39, conductors 46, 47, motor 16, conductors 48, 49, contacts 37, 35, conductors 41, 41a and to the one pole of the energy source 42. If the movable contacts 35, 36 of the reversing switch 33 engage the fixed contacts 38, 40, the circuit of the motor 16 is completed from the other pole of the energy source 42, through the conductor 45, contacts 44b, 44a of the changeover switch 44, conductor 43, contacts 36, 40, conductor 48, motor 16, conductors 47, 46, contacts 38, 35, conductors 41, 41a and to the one pole of the energy source 42. The output shaft 17 of the motor 16 then rotates in the opposite direction.

If the user of the camera wishes to make the last exposures of a series of exposures with fade-out effect, the knob 26 of the selector means 24 is depressed while the motor 70 is on (i.e., while the master switch 71 is closed and the output shaft 170 causes the claw pull-down to transport the film forwardly). The pusher 25 then pivots the lever 27 in a clockwise direction, as viewed in FIG. 2, so that the lever 27 stresses the spring 28. The lever 27 also pivots the carrier 21 in a clockwise direction, as viewed in FIG. 2, whereby the carrier 21 disengages the gear 19 from the gear 8 and moves it into mesh with the gear 22 on the input shaft 23 of the transmission in the casing 15. The extension 74 of the carrier 21 moves away from the pin 73 of the changeover switch 44 so that the movable or median contact 44b of the changeover switch 44 is caused to engage the fixed contact 44c. Thus, the changeover switch 44 connects the energy source 42 with the reversing switch 34. The pin 73 of the changeover switch 44 is biased by a spring (not shown) which tends to maintain it in that position in which the median contact 44b engages the fixed contact 44c.

The bell crank lever 31 which is coupled to the lever 27 by the helical spring 32 follows the clockwise pivotal movement of the lever 27, as viewed in FIG. 2. The arm 31a of the lever 31 depresses the pin 34a of the reversing switch 34 whereby the movable contacts 50, 51 respectively engage the fixed contacts 53, 55. The detent means 24b in the sleeve 24a of the selector means 24 thereupon maintains the pusher 25 in the extended position corresponding to that angular position of the carrier 21 in which the gear 19 meshes with the gear 22. The pusher 25 is permitted to return to the position of FIG. 2 in response to renewed depression of the knob 26.

As soon as the median contact 44b of the changeover switch 44 engages the fixed contact 44c and the movable contacts 50, 51, of the reversing switch 34 engage the fixed contacts 53, 55, the circuit of the motor 16 is completed from the other pole of the energy source 42, through the conductor 45, contacts 44b, 44c of the changeover switch 44, conductor 56, contacts 51, 55 of the reversing switch 34, conductor 60, terminal 64, conducting portion 62, terminal 63, conductor 59, motor 16, conductors 58, 57, contacts 53, 55 of the reversing switch 34, conductors 41, 41a, and to the one pole of the energy source 42. The gear 22 rotates the shaft 23 in a clockwise direction, as viewed in FIG. 2. This gear receives torque from the motor shaft 17 through the intermediary of the power train including the gears 18 and 19. The shaft 23 causes the shaft 14 of the dissolving shutter to rotate the rear blade 13 with reference to the front blade 12 so that the effective size of the opening in the front blade 12 decreases gradually and the camera makes exposures with fade-out effect. The exposures with fade-out effect are completed when the rear blade 13 completely overlies the opening of the front blade 12 so that the dissolving shutter does not permit any light to reach the film frame behind the aperture 9.

As soon as the motor 16 is started in response to engagement of the movable contact 44b with the fixed contact 44c of the changeover switch 44 and in response to engagement of movable contacts 50, 51 with the fixed contacts 53, 55 of the reversing switch 34, the shaft 23 causes the timer disk 61 to move its projection 78 in a clockwise direction, as viewed in FIG. 2, and to release the blocking pawl 75 to the action of the spring 77 which causes the pallet 75b to engage and retain the extension 74 of the carrier 21. Thus, the blocking pawl 75 then maintains the gear 19 in mesh with the gear 22.

The motor 16 is arrested in a fully automatic way in response to completion of a predetermined number of exposures with fade-out effect. Such stoppage of the motor 16 is caused by the timer disk 61 which moves the insulator 61a into register with the elastic terminal 63 to thus open the circuit of the motor 16. At the same time, the timer disk 65 opens the circuit of the motor 70 by moving the insulator 65a into engagement with the elastic terminal 68. As can be seen in FIG. 2, the timer disks 61, 65 rotate through an angle of about 250° in order to respectively open the circuits of the motors 16 and 70.

Prior to making the next series of exposures, the user depresses the knob 26 of the selector means 24 to thus disengage the detent means 24b in the sleeve 24a so that the spring 28 can return the pusher 25 to the position shown in FIG. 2.

The lever 27 causes the bell crank lever 31 to reassume the angular position shown in FIG. 2 so that the arm 31a releases the pin 34a and the movable contacts 50, 51 of the reversing switch 34 return to the positions shown in FIG. 3. The pallet 75b of the blocking pawl 75, continues to hold the carrier 21 in that angular position in which the gear 19 meshes with the gear 22. Thus, the spring 29 remains in stressed condition and the median contact 44b of the changeover switch 44 continues to engage the fixed contact 44C.

The motor 16 is started in immediate response to engagement of movable contacts 50, 51 with the fixed contacts 52, 54 of the reversing switch 34. However, the shaft 17 then rotates in the opposite direction and the shaft 23 causes the rear blade 13 to gradually increase the effective size of the opening in the front blade 12 of the dissolvinG shutter. The circuit of the motor 16 is then completed from the other pole of the energy source 42, through the conductor 45, contacts 44b, 44c of the changeover switch 44, conductor 56, contacts 51, 54 of the reversing switch 34, conductors 57, 58, motor 16, conductor 59, contacts 52, 50 of the reversing switch 34, conductors 41, 41a, and to the one pole of the energy source 42.

As soon as the shaft 23 begins to turn in the counterclockwise direction (through a small angle), the terminal 63 reengages the conducting portion 62 and the terminal 68 reengages the conducting portion 66. The parts 66, 68 thus complete the circuit of the motor 70 which rotates its output shaft 170 in a direction to transport the motion picture film forwardly. Of course, the completion of circuit of the motor 70 necessitates the closing of the master switch 71.

When the exposures with fade-in effect are completed, i.e., when the effective size of the opening in the front blade 12 of the dissolving shutter is increased to the maximum value, the projection 78 of the timer disk 61 engages the arm 75a and pivots the blocking pawl 75 in a clockwise direction, as viewed in FIG. 2, so that the pallet 75b releases the extension 74 and the spring 29 is free to return the carrier 21 to the illustrated angular position in which the gear 19 meshes with the gear 8. At the same time, the extension 74 depresses the pin 73 so as to move the median contact 44b of the changeover switch 44 into engagement with the fixed contact 44a. The energy source 42 is then connected with the reversing switch 33 and the reversing switch 34 is disconnected from the energy source 42 so that the circuit of the motor 16 is open.

If the user wishes to make exposures with fade-in effect by reexposing those film frames which were exposed with fade-out effect, the direction of rotation of the motor 70, is reversed in any known manner so that the motor 70 transports rearwardly that length of film which was exposed with fade-out effect. Such rearward transport of the film must be completed prior to making of exposure with fade-in effect. It is preferred to provide the camera with a suitable timer which insures that the rearward transport of film by the motor 70 upon completion of exposures with fade-out effect is terminated as soon as all of the frames which were exposed with fade-out effect are returned to a position upstream of the aperture 9, namely, between the aperture 9 and the film supply reel, not shown. Reference may be had to U.S. Pat. No. 3,494,691, which discloses a camera having a timer capable of arresting the motor of the drive for film transport with such delay that, when the motor is operated in reverse to transport the film frames rearwardly, the circuit of the motor is opened with a delay which is just long enough to insure that all frames which were exposed with fade-out effect are ready to be exposed again but with fade-in effect.

The connecting arrangement (including the parts 17, 18, 19, 8, 22) between the motor 16 and the variable focus lens 4 and dissolving shutter 11–15 can be modified in a number of way without departing from the spirit of the invention. For example, the gears 8, 19 and 22 can be replaced by friction wheels.

An important advantage of the improved motion picture camera is that the adjusting device for the variable-focus lens 4 and dissolving shutter 11–15 occupies much less room than presently known adjusting devices. Also, the improved adjusting device comprises a small number of parts and its cost is but a fraction of the cost of conventional adjusting devices for the variable-focus lens and dissolving shutter. Also, the improved adjusting device is less prone to malfunction because it employs a single motor and the means for manipulating the shutter and the variable-focus lens is impler and can be more readily operated in the proper way by an amateur photographer.

Without further analysis, the foregoing will so fully reveal the gist of the present invention that others can by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

1. In a motion picture camera, a combination comprising variable-focus lens means which is adjustable over a range of focal lengths; a fading mechanism including adjustable dissolving shutter means; and an adjusting device for said lens means and said shutter means, including a single electric motor and a connecting arrangement for operatively connecting said motor with a selected one of said means at a time.

2. A combination as defined in claim 1, wherein said connecting arrangement comprises a first rotary adjusting member for said lens means, a second rotary adjusting members for said shutter means, a driving member receiving torque from said motor, and carrier means supporting said driving member and movable between first and second positions in which said driving member respectively transmits torque to said first and second adjusting members.

3. A combination as defined in claim 2, wherein said driving member and said adjusting members are gears and said carrier is pivotable between said first and second positions.

4. A combination as defined in claim 2, further comprising transmission means forming part of said shutter means and including an input member receiving motion from said second adjusting member.

5. A combination as defined in claim 2, further comprising manually operable selector means for effecting the movements of said carrier means between said first and second positions.

6. A combination as defined in claim 1, wherein said motor is a reversible motor and further comprising first and second reversing switch means connectable into circuit with said motor and actuatable to change the direction of rotation of said motor when said connecting arrangement respectively connects said motor with said lens means and with said shutter means.

7. A combination as defined in claim 6, wherein said connecting arrangement comprises a first rotary adjusting member for said lens means, a second rotary adjusting member for said shutter means, a driving member receiving torque from said motor, carrier means supporting said driving member and movable between first and second positions in which said driving member respectively transmits torque to said first and second adjusting members, and selector means operable to effect the movements of said carrier means between said first and second positions, and further comprising means for actuating said second reversing switch means in response to operation of said selector means.

8. A combination as defined in claim 6, further comprising a source of electrical energy and multi-way changeover switch means operable to assume first and second positions and to thus respectively connect said energy source in circuit with said motor by way of said first and second reversing switch means.

9. A combination as defined in claim 8, further comprising means for respectively moving said changeover switch means to said first and second positions in response to movement of said carrier means from said first to said second position thereof.

10. A combination as defined in claim 9, wherein said means for moving said changeover switch means includes a portion of said carrier means.

11. A combination as defined in claim 1, wherein said connecting arrangement comprises a first rotary adjusting member for said lens means, a second rotary adjusting member for said shutter means, a driving member receiving torque from said motor, carrier means supporting said driving member and movable between first and second positions in which said driving member respectively transmits torque to said first and second adjusting members, and means for biasing said carrier means to one of said positions.

12. A combination as defined in claim 11, wherein said means for biasing comprises spring means arranged to bias said carrier means to said first position so that said driving member is normally in a position to transmit torque to said first adjusting member.

13. A combination as defined in claim 11, wherein said motor is a reversible motor and said biasing means is arranged to bias said carrier means to said first position, and further comprising selector means operable to move said carrier means from said first position to said second position, and blocking means for releasably holding said carrier means in said second position against the opposition of said biasing means.

14. A combination as defined in claim 13, wherein said motor includes an output member operatively connected with said driving member and rotatable in two directions to respectively adjust said shutter means during the making of exposures with fade-out and fade-in effect, and means for changing the direction of rotation of said output member while said carrier means is held by said blocking means against the opposition of said biasing means.

15. A combination as defined in claim 14, further comprising means for disengaging said block means from said carrier means in response to completion of adjustment of said shutter means for the purpose of making exposures with fade-in effect.

16. A combination as defined in claim 15, wherein said disengaging means receives motion from said second adjusting means.

17. A combination as defined in claim 16, wherein said disengaging means comprises a rotary timer which is driven by said second adjusting member when said carrier means assumes said second position and said motor rotates said driving member, said timer being arranged to open the circuit of said motor in response to predetermined angular displacement of said second adjusting member in one direction during the making of exposures with fade-out effect.

18. A combination as defined in claim 1, wherein said connecting arrangement comprises a first rotary adjusting member for said lens means, a second rotary adjusting member for said shutter means, a driving member receiving torque from said motor, a carrier means supporting said driving member and movable between first and second positions in which said driving member respectively transmits torque to said first and second adjusting members, and further comprising selector means including a spring-biased pusher movable between first and second positions to thereby effect the movements of said carrier means from the one to the other position thereof, a manually operable element for moving said pusher to said second position in response to a first operation of said element and to effect the movement of said pusher to said first position in response to a renewed operation of said element, and detent means for yieldably holding said pusher in said second position between said first and renewed operations of said manually operable element.

19. A combination as defined in claim 1, wherein said connecting arrangement comprises a first rotary adjusting member for said lens means, a second rotary adjusting member for said shutter means, a driving member receiving torque from said motor, and carrier means supporting said driving member and movable between first and second positions in which said driving member respectively transmits torque to said first and second adjusting members, and further comprising a drive for film transport including a second electric motor arranged to transport the film forwardly while said driving member transmits torque to either of said adjusting members.

20. A combination as defined in claim 19, wherein lease one of said motors is a reversible electric motor.

* * * * *